April 21, 1970 P. W. CRAPUCHETTES 3,508,173

BROAD-BAND GAIN EQUALIZER

Filed June 6, 1967

INVENTOR:
Paul W. Crapuchettes

By Ronald M. Goldman
ATTORNEY 3,508,173

BROAD-BAND GAIN EQUALIZER

Paul W. Crapuchettes, Woodside, Calif., assignor to Litton Precision Products, Inc., San Carlos, Calif., a corporation of Delaware Filed June 6, 1967, Ser. No. 644,006
Int. Cl. H03h 7/38, 7/14
U.S. Cl. 333—28 15 Claims

ABSTRACT OF THE DISCLOSURE

A microwave network is adapted to be coupled with an O-type traveling wave tube so as to provide broad band equalization of the tube characteristics. The network includes an inner coaxial transmission line coaxially surrounded by an outer coaxial transmission line with a microwave passage therebetween. The outer coaxial transmission line includes a short-circuit termination located at a predetermined distance from the microwave passage and a body of dissipative material is disposed physically blocking this passage.

Figure 1:
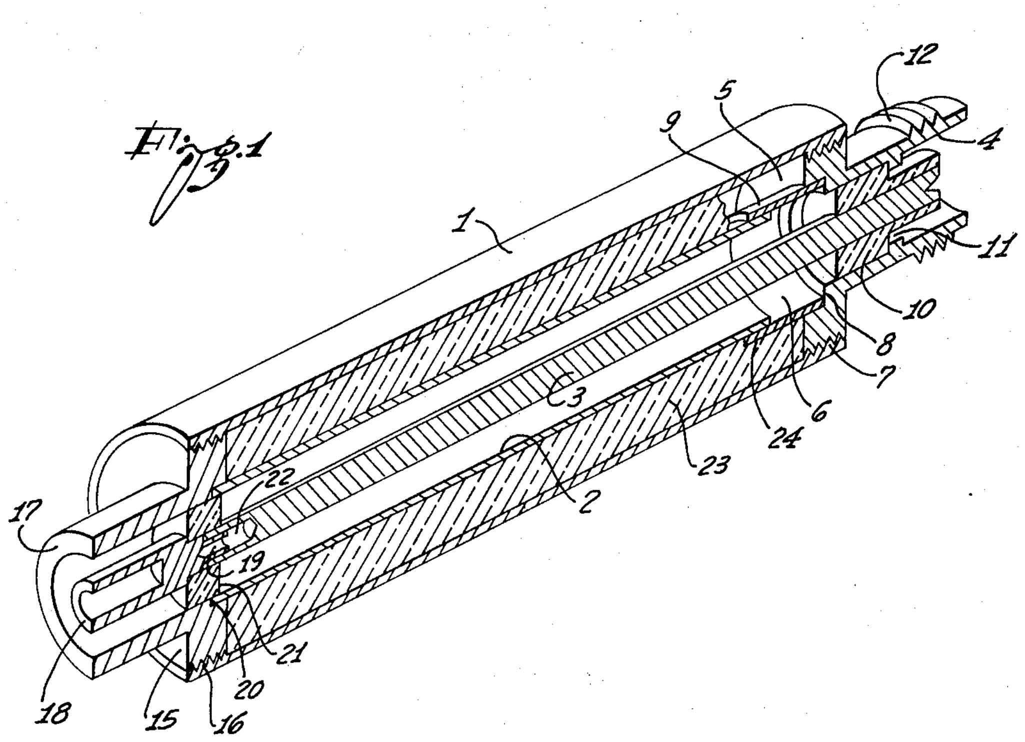

This invention relates to microwave impedance networks or gain equalizers, as variously termed, and more particularly to a network adapted to be coupled in the signal circuit of a traveling wave tube for equalizing the tube gain characteristics over a predetermined bandwidth of frequencies.

Traveling wave tubes are useful for amplifying signals in the microwave region. Like other types of tubes, they amplify signals supplied to an input, converting them to a larger level signal at its output. As is common, to amplifiers, the degree of amplification of such signals depends upon and is a function of its frequency.

As is known, O-type traveling wave tubes exhibit a somewhat peaked gain characteristic. Hence, if the tube is to be used to amplify a signal of only a single frequency, that frequency at which the tube provides the greatest gain is usually chosen and no problems exist. However, as is often the case, the signals to be amplified are not all of the same frequency. Consequently, if a signal of one frequency is for example amplified by a factor of 10,000 and another signal of a different frequency is amplified by a factor of only 5,000 because of this peaked gain characteristic of the tube, the output signals do not accurately reflect the relative levels of the signals which were supplied to the tube input. In short, the gain characteristic of the tube or output lacks "fidelity."

In essence, the same need for high-fidelity normally desired at audio frequencies also exists at microwave frequencies. Numerous means exist in the prior art which "broaden out" or "flatten" the tube output. That is, with compensating devices the bandwidth of the tube is made such that the tube or amplifier output in the range or band of desired signal input frequencies is more nearly uniform and any signal within that frequency band is amplified by the same approximate factor—10,000 in the cited example.

At microwave frequencies, these compensating devices do not utilize the ordinary electronic components common to lower audio or radio frequencies. Because the wavelength of signals at microwave frequencies more nearly equals the size of components, the predictability or reproduceability of elements such as capacitance and inductance becomes a problem. Accordingly, each compensating device or microwave network so used must be thoroughly tested and tailored to ensure agreement between the network characteristics in the product and the desired attenuation characteristics over the frequency band. As a result, a great deal of additional time must be invested by a skilled technician which is reflected in a more expensive compensating microwave network than is economically desirable.

Moreover, because of the standardization necessary to maintain minimum costs of production, the manufacturer of these microwave compensators or equalizers generally designs and produces in his standard housing and does not consider the particular problems of electron tube manufacturers. Accordingly, the prior art compensators must be separately mounted, require additional cables and connectors, and require more space than is desirable.

Accordingly, it is an object of the invention to provide a traveling wave tube having a uniform gain characteristic;

It is another object of the invention to provide a microwave impedance network which is coupled into the signal circuit of a traveling wave tube to make the gain characteristics of the tube more uniform over a broad bandwidth of frequencies.

It is a further object of the invention to provide a microwave impedance network which may be mounted directly to and is supported by the body of a traveling wave tube.

It is a still further object of the invention to provide a microwave attenuator that is small, mechanically rugged, and consists of a minimal number of relatively uncomplicated elements.

It is a further object of the invention to provide a microwave impedance network that is easily assembled, easily reproduced, and susceptible to mass production techniques, while possessing proper electrical characteristics without requiring the services of skilled personnel.

Briefly stated, the invention includes a first hollow conductive cylinder and a second hollow conductive cylinder mounted concentrically within the first cylinder to form therebetween a first or outer coaxial transmission line and a third conductor extends concentrically through the second hollow conductive cylinder and forms therebetween a second or inner coaxial transmission line.

A microwave passage is provided between the first and second coaxial transmission lines and a body of attenuative material is disposed physically blocking the passage for attenuating microwave energy passing therethrough and along the second transmission line.

A short-circuit termination is located in the first coaxial transmission line spaced from this passage. The other end of the first coaxial waveguide is preferably ended at the passage.

Further in accordance with the invention, a fourth hollow conductive cylinder is mounted coaxially with the third conductor to form an extension of the second coaxial waveguide and is spaced from the second hollow conductive cylinder to form the aforesaid microwave passage. Additionally, the fourth cylinder contains an annular portion which borders on the inner periphery of the first cylinder so as to end the first coaxial waveguide in the passage.

Typically, the distance between the microwave passage and the spaced short-circuit termination is about three-quarters wavelengths in the first coaxial waveguide at the design center frequency, *f*, and thus affords the function of the familiar short-circuited stub tuner. In this instance, because the location of the short-circuit is fixed, the impedance offered to microwave frequency fields at the passage is dependent upon the frequency of the microwave field. For a frequency at which the distance is three-quarters wavelength, the impedance is infinitely large while at other frequencies where the length is greater or lesser the impedance is smaller.

This impedance is effectively combined in parallel with the attenuative material disposed blocking the passage.

Thus, in accordance with this aspect of the invention, because the stub tuner and attenuative material are effectively connected electrically in parallel, which decreases in value with departures from *f*, the impedance of the network is greatest at the design frequency, *f*, and tapers off at each side thereof. This impedance characteristic is the inverse of the gain characteristic of the traveling wave tube and which when combined therewith results in a more uniform or flattened overall gain characteristic.

Figure 2:
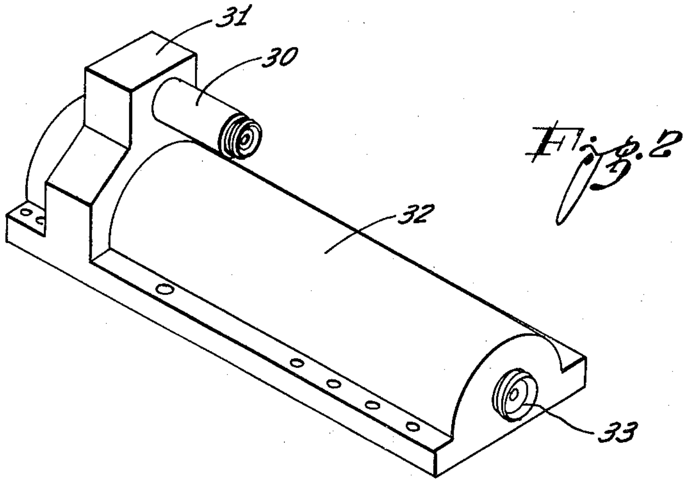

The foregoing and other objects and advantages are readily apparent from consideration of the following detailed description taken together with the figures of the drawings in which:

FIGURE 1 shows a sectionalized view of the impedance network of the invention; and FIGURE 2 shows a traveling wave tube supporting an impedance network of the invention and connected therewith to provide broad band gain equalization.

The equalizer in FIGURE 1 is essentially a microwave impedance network having frequency dependent impedance characteristics which complement the gain characteristics of the traveling wave tube in order to flatten out the overall gain characteristics thereof. This impedance network, as is illustrated, includes a first hollow conductive cylinder 1. Concentric with and mounted within cylinder 1 is a second hollow conductive cylinder 2, and a third rod-like conductor 3 is concentrically located within the second cylinder. The inner diameter of the first cylinder 1 is sufficiently larger than the outer diameter of cylinder 2 so as to form a space therebetween. Each of cylinders 1 and 2 and conductor 3 are, more or less, rigid shapes. Likewise, rod-like conductor 3 is smaller in diameter than the inner diameter of cylinder 2 to form a space therebetween. A fourth hollow conductive cylinder 4 is of an inner diameter substantially the same as the inner diameter of cylinder 2 and is mounted coaxially with rod-like conductor 3. Hollow conductive cylinder 4 contains an annular portion 5 at one end which contacts the entire inner periphery of cylinder 1 and borders the space formed between concentrically mounted conductive cylinders 1 and 2. Cylinder 4, and more particularly, the annular portion 5 thereof, is also mounted spaced from one end of cylinder 2 to form a ring-like or cylindrical shaped microwave passage 6 between the space between conductive cylinder 1 and conductive cylinder 2 and the space between conductive cylinder 2 and rod-like conductor 3. In FIGURE 1, hollow cylinder 4 is attached to cylinder 1 by means of a complementary threaded portion 7 on both the outer periphery of annular portion 5 and the inner periphery at an end of conductive cylinder 1.

A seat or rim 8 is situated along an inner edge of the annular portion 5. Seated at one end within rim 8 is a thin ring-shaped or short hollow cylinder 9 constructed of microwave dissipative or attenuative material, such as "Teledeltos" paper. This cylindrical shaped dissipative material 9 extends over the microwave passage 6 and is seated at its other end on the outer periphery of conductive cylinder 2.

A spacer 10 of nonconductive dielectric material is mounted within cylinder 4 and abutts against a circular rim 11 which projects from the inner periphery of cylinder 4. Conductor 3 extends through a passage in spacer 10 so that the spacer maintains the spacing between conductor 3 and conductive cylinder 2. As is apparent from FIGURE 1, the outer periphery of a portion of cylinder 4 contains threads 12. This feature combined with a choice in length for conductor 3 allowing it to be both concentrically mounted within and recessed from the end of cylinder 4 permits 3 and 4 to function additionally as an electrical connector. This permits the coupling of the network to the coaxial connector of other electrical equipment or transmission lines. The space between cylinders 1 and 2 is bordered at the other end by a washer shaped annular conductive member 15 which contacts the inner periphery of conductive cylinder 1 and the outer periphery of cylinder 2 to form an electrical short circuit. Advantageously, annular member 15 contains threads 16 along its outer periphery which screw into a complementing thread around the inner periphery of cylinder 1 for joining the members together.

Integral with annular member 15 is a fifth hollow cylindrical member 17 which is of a like inner diameter to cylinder 2 and which is mounted coaxially with conductor 3. For assembly purposes, conductor 3 includes an extension 18 with a reduced diameter portion 19 engaging a hollowed out portion 22 within the main portion of conductor 3 so as to form a socket therewith. Extension 18 is coaxially mounted within cylinder 17 and annular member 15.

Annular member 15 contains a groove 20 around its inner periphery which seats an end of cylinder 2. A dielectric spacer 21 borders the inner diameter of the annular member 15 and contains a passage therethrough. This passage supports both the extension 18 of conductor 3 and an end of conductor 3 at the socket so as to maintain the spacing between cylinder 2 and conductor 3 at this end of the impedance network. As is apparent, elements 17 and 18 form an electrical connector suitable for connection with the traveling wave tube of FIGURE 2. However, it is apparent that a thread such as 12 could be formed on element 17 in order to provide a suitable coaxial connector for coupling with other familiar coaxial connectors.

A hollow cylindrical "Teflon" cylinder 23, which is a suitably chosen dielectric material, contains a counter bore 24 at one end and is dimensioned so as to fit within the space between cylinders 1 and 2 and the borders formed with elements 5 and 15 with the counter bore allowing clearance for the body of dissipative material 9. Cylinder 23 is illustrated with a section cut away at an end to allow a view of dissipative material 9.

As is apparent, the network of FIGURE 1 is easily assembled by fitting element 18 into spacer 21 and fitting spacer 21 within the annular portion 15 of that conductive member. Subsequently, cylinder 2 is easily fitted within the groove 20 in conductive member 15. Cylinder 1 is then coupled to the outer periphery of element 15 by the mating of threaded portions 16. At this step, the "Teflon" cylinder 23 is seated within the space between cylinders 1 and 2.

Next, the dielectric spacer 10 is seated within conductive cylinder 4 and conductor 3, a rigid rod-like member, is inserted and seated within spacer 10. The hollow cylinder of dissipative material 9 is seated within groove 8 and completes this subassembly. By holding an end of cylinder 4, conductor 3 is inserted into cylinder 2 and is manipulated so that it engages the socket-like connection with conductor extension 18. Upon such engagement, the assembly is pushed in a predetermined amount while allowing the dissipative material 9 to slide onto the surface of cylinder 2. Hollow conductor 4 is then rotated so as to engage its threaded portion with the thread on the inner periphery of cylinder 1 and is screwed into place. Thus, the network is conveniently and simply formed.

Cylinder 1 and cylinder 2 and the space therebetween forms what is commonly termed a coaxial transmission line which extends between the passage 6 and the annular conductive member 15. Likewise, conductor 2 and 3 and the space therebetween form essentially another coaxial transmission line having its outer conductor, cylinder 2, of large diameter and in common with the inner conductor of the outer or first transmission line extending between coupling members 4 and 17. While a dissipative material 9 is disposed blocking passage 6 between the first and second transmission lines as described, it does not prevent microwave energy from passing therethrough the microwave fields pass from the first line through the passage and into the second line.

The distance between the annular conductive member 15 and microwave passage 6 spaced therefrom is, in accordance with the principles of this invention, approximately three-quarter wavelengths in the transmission line at the center frequency, $f$, of signals which are to be transmitted through the network along the second coaxial transmission line. As is well known in the theory of transmission lines, an element such as annular conductive member 15 which short circuits the end of the second transmission line and which is located one-quarter wavelengths or an odd integral, $n$, which is three in the illustrated embodiment, thereof distant from the input to the line, here passage 6, appears to be a substantially open circuit or very high impedance at its input or entrance to signals at the center frequency. To frequencies above and below that frequency, the length of the first transmission line is respectively greater or less than three-quarters wavelength and therefore the first transmission offers effectively finite values of impedance to signals of those different frequencies.

At a frequency higher than, $f$, at which the length of the first short circuited transmission line is equal to one wavelength, $\lambda$, or multiples $$\frac{n+1}{4}\lambda$$

thereof, where $n$ is an odd integral, then the impedance presented at the waveguide input is theoretically zero. Likewise, at a frequency lower than $f$ at which the length of the first short circuited transmission line is equal to one-half wavelength, $\lambda/2$ or multiples $$\frac{n-1}{4}\lambda$$

thereof, where $n$ is an odd integral, then the impedance presented at the input thereto is likewise zero.

Such behavior of a short circuited line is mathematically described as $Z=jZ_0 \tan Bl$, where $B=2\pi/\lambda$ and $l$=length of the second transmission line, $\lambda$=wavelength of a frequency in the transmission line $2\pi=360°$ and $Z_0$=the characteristic impedance of the transmission line.

The dissipative material 9 attenuates electrical fields propagating down the second coaxial transmission line formed between conductors 2 and 3. Effectively, this dissipative material or resistance 9 is in series with the second coaxial transmission line because it and passage 6 substitute for a conductive, relatively loss free, wall. The effective impedance, Z, of the outer or first coaxial transmission line appears in parallel with the resistance of element 9. Hence, at the center frequency, $f$, the impedance in parallel with 9 presented by the three-quarter wavelength waveguide is theoretically infinite. Consequently, the attenuation or loss to signals of the center frequency, $f$, propagating through the first waveguide is substantially equal to that caused by dissipative material 9 alone. At frequencies above and below center frequency, $f$, the impedance, Z, presented in parallel with material 9 is finite and of a lower value. Where the frequency is such that the length of the short circuited transmission line equals one-half or a full wavelength the impedance is zero. Hence, such impedance in parallel with resistance 9 short circuits the attenuation presented by resistance 9 in series with the second line and the microwave energy passing through the network is not attenuated.

While the foregoing explanation adequately describes the operation and construction of the structure in its broad sense, the following principles and details are offered for its greater practical value. The second inner coaxial waveguide is dimensioned such that it possesses a characteristic impedance, $Z_0$, of approximately 50 ohms in order to match a like impedance in the electrical circuit to which it is connected.

As is known, the dimensions of such coaxial lines are related to the characteristic impedance thereof by the approximate mathematical equation:

$$Z_0=\frac{60}{\sqrt{\epsilon/\epsilon_0}}\log_0 b/a \text{ ohms}$$

where $b$=the diameter of the outer conductor of that coaxial waveguide, $a$=the diameter of the inner conductor of that coaxial waveguide, $\epsilon$=permittivity of the dielectric between the conductors, $\epsilon_0$=permittivity of air.

In the first waveguide $\epsilon$ is approximately equal to $\epsilon_0$ corrected for the dielectric of spacers 5 and 10. In the second waveguide however, $\epsilon$ is greater than $\epsilon_0$ and equal to that of the chosen dielectric.

For optimum smoothness in variation of attenuation, the first or outer coaxial line is dimensioned so that it possesses a characteristic impedance $Z'_0$, of approximately the same value as the resistance, 9.

Since the maximum value of attenuation is effectively provided by the impedance network at the center frequency, $f$, and is due to the dissipative properties of resistance 9, the material is chosen and dimensioned, upon experiment, to possess a sufficient amount of exposed area, thickness, bulk resistivity, and surface resistivity to provide the desired mid-band attenuation. The material in the illustration is "Teledeltos" while carbon and other dissipative material may likewise be used if such satisfies the electrical requirements of the particular network to be constructed.

The aforementioned values of impedance were chosen so that $Z_0'^{a}=.85\ Z_0$ and $R^{a}=.85\ Z_0=Z_0'$. It was determined that with those particular relationships desirable smoothness in variation of attenuation and standing wave ratio over the frequency range are derived.

Therefore it is apparent that at the center frequency, $f$, the network provides a maximum attenuation to microwave energy propagating theerthrough, while at frequencies on either side of $f$, the impedance of the network decreases to approximately zero in a continuous manner. Since the gain characteristics of the particular traveling wave tube of FIGURE 2 is such that it is peaked at a frequency $f$ and falls off at either side of that frequency, the characteristics of the described microwave network complements or equalizes that characteristic, which results in a flattening-out of the gain characteristics of the equalizer-traveling wave tube combination. Thus, the gain of an amplifier using the equalizer-traveling wave tube combination is made as variously termed more uniform, broad-band or of high-fidelity.

FIGURE 2 shows in perspective the microwave network or broad-band equalizer 30 connected to a flange 31 which in turn is mounted to the metallic enclosure 32 of an O-type traveling wave tube, such as is manufactured by Litton Industries, Electron Tube Division under the designation L5085. In this assembly, the end network elements 17 and 18 illustrated in FIGURE 1 are inserted into a cylindrical passage in the flange 31 where 17 is held in position by set screws which extend through flange 31 but which are not visible in the perspective. This mounting supports network 30. In this particular tube the equalizer 30 is electrically connected to the input circuit of the traveling wave tube and the amplified tube output is taken from coaxial connector 33. However, as is apparent, by modification of the flange the equalizer may instead be connected in circuit with the output of the traveling wave tube for accomplishing the same purposes of gain equalization. It is apparent from the perspective of FIGURE 2 that the equalizer 30 is simple and compact. In both rigidity, size, and outer-construction, the outer appearance of the microwave network resembles the rugged Bakelite portion of a familiar telephone switchboard plug.

In the foregoing embodiment of FIGURE 2 the gain equalizing properties of the microwave network are effective over a complete octave of frequencies over which the traveling wave tube is to operate. That is, the frequency of the upper end of the band, $f_h$, is such that the length of the first or outer short circuited coaxial transmission line equals $\lambda_h$, where $\lambda_h f_h = c$, velocity of the frequency within the transmission line; the midband frequency $f$ is such that the length of the outer short circuited coaxial waveguide equals $3\lambda/4$, where $f\lambda = c$; and the frequency of the lower end of the frequency band, $f_l$, is such that the length of the outer coaxial waveguide equals $\frac{1}{2}\lambda_l$, where $f_l\lambda_l = c$.

In addition to the foregoing qualities, it is apparent that the microwave network is easily assembled manually by unskilled personnel and does not require any extensive testing. As is common in coaxial lines and as previously discussed, the characteristic impedance, $Z_0$, of each of the first and second coaxial transmission lines included in the structure of FIGURE 1 is determined primarily by the relative dimensions and spacing between the conductors; and the size and shape of the dissipative material 9 is determined by that necessary to provide the desired electrical properties. Since each of the elements used is a more or less rigid body of simple shape, once the parts have been manufactured to the requisite manufacturing tolerances and assembled they immediately possess the desired electrical characteristics of the network. Consequently, the simple procedure previously described of assembling the elements into the completed form shown in FIGURE 1 provides a network of the desired electrical characteristics. Moreover, because of the relatively simple parts, a large number of these networks may be simultaneously manufactured and assembled and all yield the same desired electrical characteristics. Because of this, the network is relatively inexpensive compared to the more exotic type of networks which require custom manufacture and extensive testing by skilled personnel.

The foregoing embodiments have been presented solely for purposes of illustration and are not intended to limit the invention since many other equivalents suggest themselves to one skilled in the art. For instance, in addition to variation in the values of the parameters illustrated to fit any particular design requirements, and variations in the locations of elements, it is apparent that modifications may be made in the length of the short circuited coaxial line or even in substitution of any equivalent open circuited lines. These alternatives and variations suggest themselves to one skilled in the art in order to provide any desired frequency versus impedance characteristic with the impedance network. Accordingly, they are within the spirit and scope of the invention.

It is therefore not the intent of the foregoing description to limit in any way the breadth and scope of the invention set forth and defined in the appended claims.

What is claimed is:

1. A microwave impedance network comprising:

(A) a first coaxial transmission line having an inner and outer conductor;

(B) a second coaxial transmission line coaxial with said first coaxial transmission line having an outer conductor and an inner conductor, said outer conductor of said second coaxial transmission line in common with the inner conductor of said first coaxial transmission line to form a common conductor;

(C) microwave passage means in said common conductor for permitting the passage of microwave fields between said first and second coaxial transmission lines;

(D) a body of microwave attenuative material covering in said microwave passage means for attenuating microwave energy;

(E) short circuit termination means in said first coaxial transmission line, said short circuit termination means being spaced a distance of ¾ λ from said microwave passage means, wherein λ is the wavelength of a predetermined design frequency, $f$, propagated in said first coaxial transmission line;

(F) first and second electrical connectors coupled to one end and the other end, respectively, of said second coaxial transmission line.

2. The invention as defined in claim 1 wherein said microwave passage means comprises an annular opening about the periphery of said common conductor and said attenuator body surrounds said annular opening.

3. The invention as defined in claim 2 wherein said second coaxial transmission line includes at least one connector portion at an end.

4. A microwave impedance network comprising:

(A) a first hollow conductive cylinder;

(B) a second hollow conductive cylinder shorter in length than said first cylinder mounted concentrically within said first cylinder to form therewith an outer coaxial transmission line;

(C) a third conductor concentrically mounted within and extending through said second cylinder to form therewith an inner coaxial transmission line;

(D) a fourth hollow conductive cylinder having an inner diameter substantially the same as the inner diameter of said second hollow cylinder, said fourth hollow cylinder having an annular end portion bordering the inner periphery of said first cylinder and spaced from an end of said second cylinder to form a microwave passage between said inner and outer transmission lines and to terminate said outer coaxial transmission line at one end proximate said passage, said fourth cylinder mounted coaxially with said third conductor to form an extension of said inner coaxial transmission line;

(F) a short hollow cylindrical body of attenuative material for attenuating microwave energy mounted covering said microwave passage, and;

(G) an annular conductive member at a location within said outer transmission line remote from said passage, said member bordering both the inner periphery of said first cylinder and the outer periphery of said second cylinder to form a short circuit thereat in said outer coaxial transmission line.

5. The invention as defined in claim 4 wherein said third conductor extends within said fourth cylinder and further comprising first dielectric spacer means located between said third conductor and the inner periphery of said fourth cylinder for maintaining a spacing therebetween.

6. The invention as defined in claim 5 wherein said fourth cylinder further comprises a threaded portion on the outer periphery thereof to form a coaxial coupling adapted to connect with a mating electrical connector.

7. The invention as defined in claim 6 further comprising a fifth hollow conductive cylinder having an inner diameter substantially the same as said second cylinder coaxially mounted with respect to said third conductor and contacting an end of said second cylinder to form an extension of said inner transmission line, and wherein said annular conductive member is integral therewith.

8. The invention as defined in claim 7 wherein each end of said first cylinder contains a threaded portion on its inner periphery and each of said annular conductive member and said annular portion of said fourth hollow cylinder contains a threaded portion along their respective outer peripheries for coupling engagement with the respective ends of said first cylinder.

9. The invention as defined in claim 4 wherein said annular conductive member is spaced from said passage by a distance $n/4\lambda$, where $n$ is an odd integral and $\lambda$ is the wavelength within the transmission line of a design frequency, $f$.

10. The invention as defined in claim 9 wherein $n=3$.

11. The invention as defined in claim 9 wherein said cylindrical body of attenuative material possesses a resistance of R, said second coaxial transmission line possesses a characteristic impedance of $Z_0$, and said first coaxial transmission line possesses a characteristic impedance $Z'_0$, and wherein $Z'^{a}_0=R$.

12. The invention as defined in claim 11 wherein $Z'^{a}_0=R^a=.85Z_0$.

13. The invention as defined in claim 5 further comprising: a hollow cylindrical body of dielectric material coaxially mounted between and substantially filling the space between said first and second conductive cylinders.

14. The invention as defined in claim 8 further comprising: a hollow cylindrical body of dielectric material coaxially mounted between and substantially filling the space between said first and second conductive cylinders.

15. The invention as defined in claim 11 further comprising: a hollow cylindrical body of dielectric material coaxially mounted between and substantially filling the space between said first and second conductive cylinders.

References Cited

UNITED STATES PATENTS

| | | | |
|---|---|---|---|
| 3,414,844 | 12/1968 | Putz | 333—10 |
| 3,411,114 | 11/1968 | Schmid | 333—73 |
| 2,925,565 | 2/1960 | Cook et al. | 333—6 |
| 2,485,031 | 10/1949 | Bradley. | |
| 3,222,623 | 12/1965 | Gaikler | 333—73 |
| 2,771,516 | 11/1956 | Buchsbaum. | |

HERMAN KARL SAALBACH, Primary Examiner

C. BARAFF, Assistant Examiner

U.S. Cl. X.R.

333—73, 81